Nov. 21, 1939.  J. H. THOMAS  2,181,030
ELECTRIC GLASS FURNACE
Original Filed Dec. 30, 1936
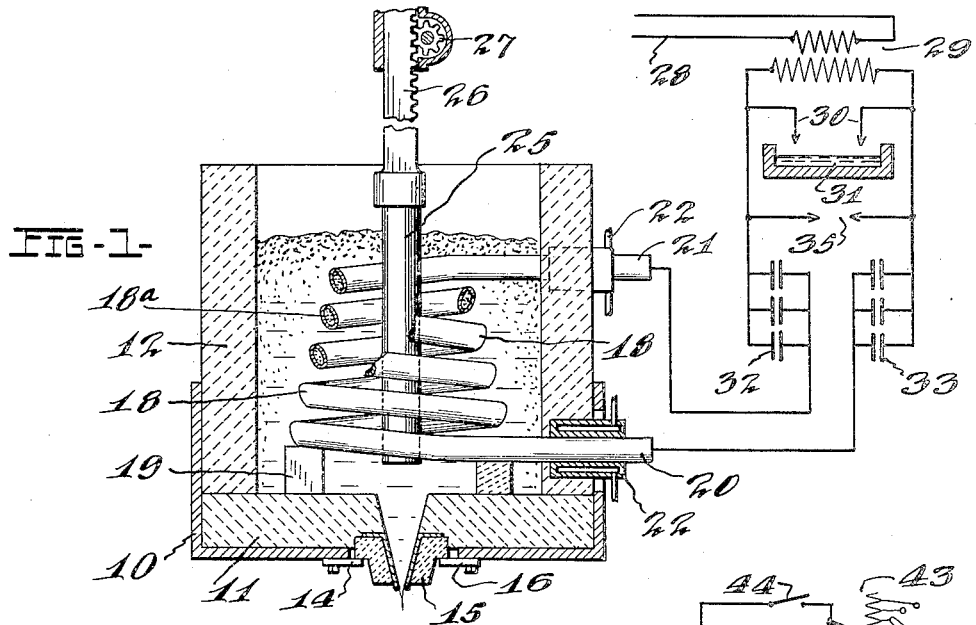
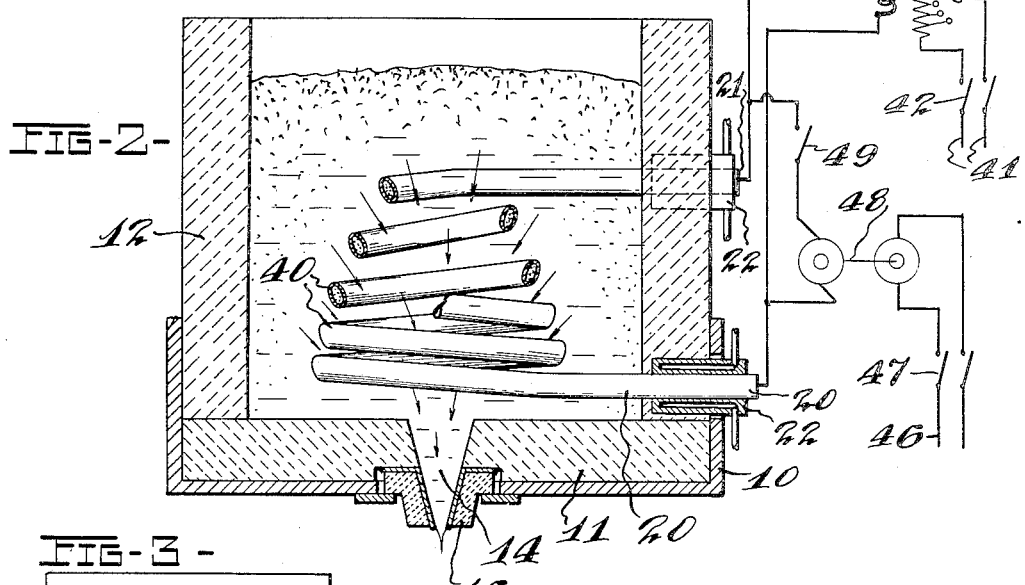
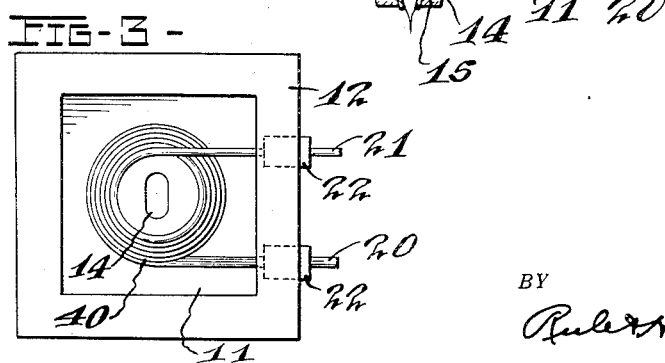
INVENTOR
J. H. Thomas
BY
Ruler & Hoge ATTORNEYS Patented Nov. 21, 1939

2,181,030

UNITED STATES PATENT OFFICE 2,181,030

ELECTRIC GLASS FURNACE

John H. Thomas, Newark, Ohio, assignor to Owens-Illinois Glass Company, a corporation of Ohio Application December 30, 1936, Serial No. 118,309
Renewed April 17, 1939

11 Claims. (Cl. 13—6)

The present invention relates to a novel glass furnace and more particularly to a novel construction and arrangement of parts for electrically heating and melting the glass, part of the heat being generated by induction and simultaneously therewith another part of the heat emanating from resistors. The present invention also relates in part to a new method and apparatus for melting glass and similar material and more particularly to certain novel improvements in the electric elements and in their arrangement for certain novel purposes. The invention is herein particularly described as adapted and used in melting and refining glass, but it will be understood that the invention is not limited to such use but comprehends the treatment of various other substances.

An object of the invention is to provide a novel and practical apparatus by which raw glass batch or the like is melted and fined rapidly and economically, with the expenditure of a comparatively small amount of heat and with a furnace or apparatus which is small as compared with furnaces of the types now in general use, of equal productive capacity.

Another object of the present invention is to achieve greater melting efficiencies for glass and to produce a clearer, brighter glass which is free from impurities which ordinarily enter the glass from the electrical heating elements or electrodes.

A further object of the invention is to provide a continuous localized electrical heating in an interior zone of a body of glass to be melted and to render the material in said zone fluid and preferably above the liquidus melting temperature of the glass; discharging the molten glass from this interior zone; causing the surrounding material or batch to be preheated to a temperature at which it will convey current and then fed gradually into the interior localized zone. In this manner the hottest portions of the glass are covered or surrounded with a relatively cool batch material which is preheated and gradually absorbs the outwardly radiating energy from the hottest portion and turns this energy back into the system to the end of achieving a very high heat efficiency and a reduction of the heat losses to a minimum.

Another object of the invention is to provide a method and apparatus capable of imparting electrical energy into the glass batch, whereby it becomes molten and is brought to a very high temperature and into a very fluid state. At high temperatures, say, above the molten or liquidus temperature of the glass, it is possible to introduce further electrical current without causing the current to pass through the glass in streaks which have been called hot streaks. My arrangement and apparatus favors a high degree of agitation of the glass which mixes and immediately causes the disappearance of any hot streaks or differentials of temperature throughout the glass.

It is another object of the present invention to provide an electrical glass furnace capable of melting the cold batch by means of electricity at the start of the operation without the necessity of preheating the glass to a temperature at which it will convey current. Heretofore, the preheating has generally been accomplished by means of gas burners or other apparatus extraneous to the electric melting elements or electrodes of the furnace.

Broadly speaking, the present invention contemplates providing a metal electrical induction coil which is to be inserted directly into the glass batch. An alternating current may be applied to the coil and converted into heat from and within a region within the body of glass itself, part of the heat being generated within the coil acting as a resistor and part of the heat being generated by induction directly within the glass itself.

As another feature of the present invention, I contemplate providing a platinum coil or other high temperature alloy preferably of the platinum group, which is capable of maintaining a high temperature and existing in the liquid glass without breaking down or causing disintegration of the coil or disintegration or adulteration of the glass.

Another feature of the present invention involves the design of the platinum coil which is embedded in glass batch material, having relatively cool, unmelted batch material existing outside of the coil and hot molten glass at the axis of the coil. A furnace of this type has the advantage of having the heat generating unit substantially entirely enclosed in unmelted batch material which serves to absorb and retain the outwardly radiated heat. Furthermore, the platinum coil is not thoroughly embedded in the hottest glass but may exist concentrically outside of the hottest zone, since the flow of the relatively cold batch material is through the coil in bird cage fashion from the outer periphery where it picks up heat from the platinum coil as it passes therethrough and the final high temperature heat is generated by the induction in the very center of the coil. The design of the coil may be selected with a view to facilitate the passage of incompletely melted or heated material from the outside of the coil into the interior localized heated zone.

Other objects and advantages of the present invention will become apparent from the following description taken in conjunction with the drawing, in which:

Fig. 1 is a diagrammatic cross-sectional elevational view of a furnace embodying the present invention and a means for supplying an alternating current shown partly in section;

Fig. 2 is a diagrammatic cross-sectional elevational view of another embodiment of the present invention illustrating an alternative method of applying an alternating current to the furnace; and Fig. 3 is a diagrammatic plan view of the furnace illustrated in Fig. 2.

Referring more particularly to Fig. 1, reference character 10 designates a furnace casing or supporting members for the furnace. The supporting casing 10 may be made of any suitable material such as cast iron or the like. Superimposed over and partially lining the casing 10, are refractory furnace blocks comprising a floor 11 and the side walls 12. The furnace is preferably left open at its upper end to permit the charging or feeding of raw batch material. The floor 11 is provided with an outlet opening 14 through which the molten glass may be discharged.

The outlet opening 14 may be provided with any suitable feeder apparatus such as a glass wool feeder bushing 15. The bushing 15 as illustrated is mounted in register with the outlet opening 14 and is held in place by suitable lugs 16 which are adjustably held in place and fixed to the casing 10. It will be noted, however, that any other suitable type of outlet or feeder means may be provided, this not being an essential feature of the present invention.

Arranged in an interior zone of the furnace is a metal induction coil 18, which serves as a heating element. I have found it preferable to provide a coil composed of a metal capable of withstanding the high temperatures of molten glass, and for this purpose I use a metal or alloy chosen from the platinum group, alloys of platinum and rhodium, or iridium, etc., being examples. The coil 18 may be held in position by any suitable means such as the supporting block 19 or by the extremities or terminals 20 and 21 of the condenser forming the coil 18. The ends or extremities 20 and 21 may be passed through openings in the side walls 12.

Water cooling means 22 may be provided around the terminals in order to prevent gradual deterioration or melting of the furnace walls 12 in proximity thereto. The cooling means 22 serves the additional purpose of lowering the temperature of the refractory and the glass in proximity to the terminals to such a low temperature that electrical current flow therethrough is impossible. As a result there will be no generation of heat or dissipation of electrical energy across the terminals or along the side walls 12.

Suspended in the central portion of the coil 18 is a metallic core 25 which is generally used only for starting the operation. The core 25 is mounted upon a reciprocating rack 26 which intermeshes with an adjusting gear 27. By operating the gear 27 the core 25 may be raised and lowered into and out of the furnace as desired.

As a source of an alternating current supply, any suitable means may be provided as, for example, the oscillating circuit system illustrated diagrammatically in Fig. 1. Other suitable systems may also be provided such as those illustrated in the Northrup patents, Nos. 1,286,394 and 1,286,395, each patented December 3, 1918.

In Fig. 1 electrical energy may be introduced through a power line 28 from a suitable source, the electrical energy being an alternating current having a conventional voltage and frequency. A step-up transformer 29 may be provided to step up the voltage to about 2700 volts, more or less, as desired. The secondary winding of the transformer 29 may be connected with the coil 18 through a secondary circuit adapted to create a high frequency oscillating current.

The secondary circuit comprises the electrodes 30, the mercury pool 31, banks of condensers 32 and 33, and the terminals 20 and 21 leading to the coil 18. A protective spark gap 35 which shunts the oscillating circuit when in operation, is provided to prevent overcharging of the condensers and the system. The electrodes 30 may be raised and lowered into the mercury bath 31 and adjustably spaced from the bath in order to provide a predetermined spark gap between the electrode and the bath 31.

The frequency of the oscillations in the coil 18 is dependent upon a number of factors as one skilled in the art would readily understand as, for example, the size of the coil 18 and the condensers 32, the size of the spark gap between the electrodes 30 and the mercury bath 31 and the original frequency of the voltage in the line 28. In general, the greater the inductance of the coil 18, the greater should be the capacity of the condensers 32, and the more power which is desired, the further should the electrodes 30 be lifted from the mercury bath 31 to increase the spark gap therebetween.

In regard to the design of the coil, it is desired to have the ends or terminals 20 and 21 lead out of the furnace at relatively distant portions in order to prevent a short circuiting between the two terminals. The electrical element forming the windings of the coil may be any desirable size such as, for example, about ¼ to 1 inch diameter, more or less, of course, according to the particular size and rating of the furnace. It is also desirable to construct the coil 18 from a tubular element or resistor. In general, the tubing is less expensive and also more efficient electrically since in high frequency circuits, the current flow is at the surface of the conductor. Moreover, by providing a hollow tubular element for the coil 18, the surface area of contact between the glass itself and the coil 18 is increased. The inside of the tube may be filled with any suitable material such as grog, which is a crushed refractory mixed with a small amount of clay or other suitable binding agent to form a strong supporting core for the tube or the interior of the tubular element may be water cooled although when using platinum group metals, this is generally unnecessary.

Instead of winding the coil up into a cylindrical shape, it is desirable, in order to assist the glass flow, to provide a coil having a more or less beehive or frusto-conical shape. An advantage of the use of a beehive or frusto-conical shape is the ease of feeding in batch through the interstices or openings between the individual turns of the coil, and in addition, this shape assists in the elimination of evolved gases.

As an additional feature assisting in the feeding and flow of the batch materials or unmelted glass, it is desirable to provide coils made of tubes having a flattened, oval, elongated or lenticular cross-section. Referring to reference character 18a, I have shown a cross-section of a flattened tube, the flattening being in a direction transverse to the direction of material flow. The flattening of the tubular elements is preferably in such a direction that the area of glass flow between the adjacent turns or windings of the coil, will be increased. Moreover, the area of contact between the surface of the coil and the glass as it passes therethrough may also thus be increased.

In starting the operation of this device, it is possible to fill the furnace with molten glass from another furnace and then carry on the heating by means of the energy supplied through the coil 18. When starting the operation, if cold batch materials are used, several methods are available. When the impedance in the coil 18 is relatively low and relatively low frequency is used, it is possible to introduce enough energy into the coil 18 so that it acts effectively as a resistor and heats up to a sufficient temperature to melt the surrounding glass. It is to be noted, however, that if the frequency is too high, an insufficient amperage may flow through the windings and thus prevent a speedy reduction of the batch to a molten mass.

Under such circumstances, I have provided the core 25 of suitable metal such as iron, platinum or the like, which may be inserted into the center of the coil 18 in order to permit the flux to pass therethrough and be heated by the induced current therein. The amount of heat generated by the alternating flux is directly proportional to the frequency of the change in flux or the number of cycles, the amperage of the current or intensity of the fields, and the number of windings in the coil. By regulating the frequency and the voltage, therefore, in the coil, according to the impedance and the resistance thereof, it is possible to provide sufficient heating effects in the core 25 to raise the temperature of the surrounding glass to molten temperature. After the glass has come to such temperature that it has become ionized or will carry current, the core 25 may be removed. The oscillating flux will then pass directly through the molten glass and generate heat therein.

As the batch becomes molten in the interior zone thereof, it may be passed outwardly from the bottom of the furnace or feeder 15. The batch materials surrounding the coil gradually feed radially into the windings of the coil and displace the molten batch which has fed down through the feeder bushings 15. As the supply of batch material surrounding the coil is depleted, additional batch fed in at the top of the furnace may take its place. In this manner the operation of the furnace is made continuous, and a steady flow of molten glass is assured.

In operating my furnace in this manner, several marked advantages are noted. One of the advantages of the present invention is that the material which is to be heated is close to or directly in contact with the coil itself. In prior induction furnaces, the heating was carried on in crucibles which were spaced inwardly a certain distance from the coil. In view of the fact that the heating effect from a coil varies directly with the distance between the coil and the portion to be heated, I have achieved an optimum and a maximum heating effect by embedding the coil itself within the material to be heated. Moreover, by this close contact a lower frequency is possible than in the prior furnaces.

Another advantage observed in the present invention is the method of heating which insures a high efficiency heating and a minimum degree of lost or waste heat. In this regard it is to be noted that the highest temperature takes place in an interior localized heating zone of the batch material. Any outwardly radiating heat which emanates from this hot glass passes outwardly and is absorbed by the cooler batch surrounding the high temperature zone. This cooler glass, however, is passing inwardly into the high temperature zone and accordingly, the outwardly radiating heat is absorbed and conserved and passed back into the system.

The coolest and unmelted batch which is present outside of the coil 18 gradually picks up heat which radiates from the interior zone and picks up additional heat which is generated in the coils themselves acting as resistors. The glass finally becomes hot enough to carry electrical current itself, at which time the currents induced by the oscillating flux pass through the molten glass and carry the temperature up still further. At this time, however, it is passed into the interior zone of the coil 18 where the hottest temperature is reached.

It will be noted that, as the temperature rises, there is a greater tendency for the oscillating flux to generate heat within the glass. As a result, the very center of the core being hottest, causes the induced current to pass therethrough more readily, and thus raises the temperature to its highest point by means of the cumulative effect.

The amount of heat generated by the oscillating flux, as pointed out hereinabove, is directly proportional to the frequency of the change of flux or the number of cycles, the amperage of the current, or the intensity of the field, and the number of windings in the coil. In using, therefore, a 60 cycle current, it is possible to use a low voltage, preferably in the neighborhood of about 6 to 9 volts, more or less, in accordance with the design of the furnace, and a relatively heavy current of the order of magnitude, for example, of several hundred amperes. In order to use such a low voltage, it may be necessary to provide a coil having a relatively low ohmic resistance and low impedance.

Another advantage of using a low voltage and a large amperage is found in starting the operation, as the heavy current passing through the coil may heat it sufficiently to melt the glass by conduction of heat to the glass itself.

Referring more particularly to Figs. 2 and 3, I have illustrated a slightly modified embodiment of the present invention. The design of the furnace as a whole is similar to that illustrated in Fig. 1 and like reference characters designate like elements in the two embodiments. In Figs. 2 and 3 a furnace is illustrated which is provided with a coil 40 constructed of a tubular element having lenticular or flattened cross-section, in general similar to that illustrated and described in Fig. 1. The major axes of the lenticular cross-sections may be more or less parallel with each other and in the general direction of glass flow in order to increase the open area for glass flow. This arrangement is not necessary, however, for a proper working of the invention.

In this embodiment, the number of turns of the coil may be made sufficiently low to permit the use of the coil 40 as a resistor and heat the glass originally by heat generated within the turns of the coil itself. Thus, with this embodiment, a core 25 is unnecessary. The flow of the glass through the windings into the interior localized heating zone has been indicated by the arrows and is similar to that illustrated and described in Fig. 1.

As an electric current supplied for the terminals 20 and 21 leading to the coil 40, a supply means such as shown in Fig. 1 may be provided. As shown in Fig. 2, an alternative means is shown in which two systems may be provided, one for high frequency current and one for low frequency current. The low frequency system comprises a source of supply such as a power line 41, switch 42, a variable transformer 43, the secondary circuit of which includes a switch 44, and the coil 40. The high frequency circuit comprises a source of current supply such as a power line 46, switch 47, a motor generator 48, switch 49, and the coil 40.

At the start of the operation, when the glass batch is cold and will not convey current, a low voltage and low frequency are sufficient, and for this purpose the low voltage circuit is used. After the glass has been raised in temperature sufficient to convey current, the switches 44 and 49 may be reversed and high frequency system put in operation. However, sufficient heat may be generated by the low frequency circuit so that this may be used entirely to the exclusion of any high frequency circuit.

Modifications and variations may be resorted to within the spirit and scope of the appended claims

I claim:

1. The method of melting glass which comprises establishing a body of glass materials, passing an alternating current in a predetermined convoluted path embedded in said body and which borders on the periphery of an interior zone of said body of glass materials and thereby preheating said glass adjacent said path by means of heat generated by the ohmic resistance to said current within said path, and passing said preheated glass materials into said interior zone through the interstices of said path and causing said glass to be finally heated by the induced flow of electrical current from the alternating current in said path.

2. The method of melting glass, which consists in establishing a body of glass materials, passing an alternating current through a predetermined path within an interior zone of said body and thereby inducing a flow of electrical current within said interior zone to bring the glass within said interior zone to a molten state, discharging said molten glass in a downward direction, preheating said glass materials in a preheat zone around said interior zone to bring said glass materials in said preheat zone to a temperature at which it will convey current, passing said preheated glass materials into said interior zone through the interstices of said path, and discharging molten glass from said interior zone.

3. In combination, in an electric furnace for making glass, a melting chamber for containing glass batch materials, a metallic coil within said chamber and arranged to be embedded in said glass batch materials, and means for supplying an alternating current to said coil.

4. In combination, in an electric furnace for making glass, a melting chamber for containing glass batch materials, a metallic coil within said chamber and arranged to be embedded in said glass batch materials, said coil being composed of a metal chosen from the platinum group, and means for supplying an alternating current to said coil.

5. In combination, in an electric furnace for making glass, a melting chamber for containing glass batch materials, a metallic coil within said chamber and arranged to be embedded in said glass batch materials, means for supplying an alternating current to said coil, and a movable metallic core adapted to be inserted in an interior zone of said coil.

6. In an electric furnace for making glass, a melting chamber having its charging opening at its upper end and an outlet opening at the lower end thereof, and an induction coil arranged within said chamber, said coil being formed of a tubular platinum element having the adjacent turns spaced apart to permit passage of glass materials therebetween.

7. In an electric furnace for making glass, a melting chamber having its charging opening at its upper end and an outlet opening at the lower end thereof, and an induction coil arranged within said chamber, said coil being formed of a tubular platinum element having a lenticular cross-section and having the adjacent turns of said coil spaced apart to permit the passage of batch materials therebetween into the interior of said coil.

8. In an electric furnace for making glass, a melting chamber having its charging opening at its upper end and an outlet opening at the lower end thereof, and an induction coil arranged within said chamber, said coil being formed of a tubular platinum element having a lenticular cross-section and said coil being spirally wound and having a contour converging toward the upper end thereof and having adjacent turns thereof spaced apart to permit passage of glass materials therethrough.

9. The method of melting and refining glass which comprises establishing a mass of unmelted glass-making materials, embracing an interior portion of said mass within a coiled electric circuit enveloped by a surrounding portion of said mass, causing an alternating electric current to flow within said circuit and thereby melting and fining a portion of said mass contained within an interior zone of the mass, causing the major portion of the heat radiated outwardly from said zone to be absorbed by and preheat the enveloping portion of the said mass surrounding said zone, withdrawing the glass from said zone as it is melted and refined, and feeding into said zone between adjacent coils of said circuit the said preheated glass-forming materials.

10. The method of melting and fining glass which comprises establishing a mass of glass-forming materials, maintaining an electric circuit within said mass with the said circuit surrounded and enveloped by a portion of said mass and embracing an interior portion of said mass, causing an alternating electric current flow within said circuit and thereby supplying heat caused by the ohmic resistance within said circuit, and concomitantly inducing electric current within the material embraced by said circuit and thereby supplying additional heat to said materials in sufficient amount to melt and refine the materials embraced by said circuit and feeding glass forming materials radially into said interior portion in contact with said circuit to permit said materials to gather the heat supplied thereby.

11. The method of melting and fining glass which comprises establishing a mass of glass-forming materials, maintaining a coiled electric circuit within said mass with the said circuit surrounded and enveloped by a portion of said mass and embracing an interior portion of said mass, causing an alternating electric current flow within said circuit and thereby supplying heat caused by the ohmic resistance within said circuit, concomitantly inducing electric current within the material embraced by said circuit and thereby supplying additional heat to said materials in sufficient amount to melt and refine the materials embraced by said circuit, causing a continuous downward flow and discharge from the mass, of refined glass, and concomitantly feeding fresh materials laterally inward through adjacent coils of said circuit from that portion of the mass surrounding said circuit.

JOHN H. THOMAS.